US006459211B1

(12) United States Patent
Wang

(10) Patent No.: US 6,459,211 B1
(45) Date of Patent: Oct. 1, 2002

(54) DAMPING/MUFFLING STRUCTURE FOR ELECTROLUMINESCENT CELL

(75) Inventor: Chih-Yuan Wang, Taichung Hsien (TW)

(73) Assignee: Wintek Corporation, Taichung (TW)

( * ) Notice: Subject to any disclaimer, the term of this patent is extended or adjusted under 35 U.S.C. 154(b) by 0 days.

(21) Appl. No.: 09/939,613

(22) Filed: Aug. 28, 2001

(51) Int. Cl.[7] .............................. G09G 3/10; B32B 9/00

(52) U.S. Cl. ...................................... 315/169.3; 428/690

(58) Field of Search .............................. 315/169.3, 224; 313/269, 463, 483, 491; 428/690, 917; 257/749

(56) References Cited

U.S. PATENT DOCUMENTS

| | | | | |
|---|---|---|---|---|
| 4,804,887 A | * | 2/1989 | Miyama et al. | 313/269 |
| 5,701,055 A | * | 12/1997 | Nagayama et al. | 313/504 |
| 5,858,561 A | * | 1/1999 | Epstein et al. | 257/79 |
| 5,993,932 A | * | 11/1999 | Friedl et al. | 428/218 |
| 6,351,068 B2 | * | 2/2002 | Yamazaki et al. | 313/506 |
| 6,381,196 B1 | * | 4/2002 | Hein et al. | 367/1 |

* cited by examiner

*Primary Examiner*—Don Wong
*Assistant Examiner*—Minh D A
(74) *Attorney, Agent, or Firm*—Rosenberg, Klein & Lee

(57) ABSTRACT

A damping/muffling structure for electroluminescent cell in which a damping layer is additionally disposed to provide a damping effect. When the light-emitting layer is driven by AC current to emit light, the light-emitting particles of the light-emitting layer are energized and vibrated. At this time, a friction is created between the damping molecules of the damping layer. The heat generated due to the friction can be dissipated so that the vibration of the light-emitting particles can be reduced or eliminated and a damping/muffling effect is achieved.

8 Claims, 5 Drawing Sheets

DAMPING/MUFFLING STRUCTURE FOR ELECTROLUMINESCENT CELL

BACKGROUND OF THE INVENTION

The present invention is related to a damping/muffling structure for electroluminescent cell in which specific damping material is respectively painted near the light-emitting layer which is the vibration source so as to reduce or eliminate the vibration of the light-emitting layer produced when the light-emitting layer is driven and thus reduce or eliminate noise.

A conventional electroluminescent cell (EL cell) is a thin sheet which mainly serves as a back light element applied to PDA, mobile phone, etc. FIGS. 1 and 2 show the structure of a conventional EL cell. The EL cell is a thin sheet sequentially including a transparent substrate layer 11, a front electrode layer (ITO) 12, a light-emitting layer 13, an inductive layer 14, a back electrode layer 15 and an insulating packaging layer 16 attaching thereto. The front electrode layer 12 and the back electrode layer 15 are given an AC voltage, whereby the light-emitting layer 13 of the EL cell can provide a light-emitting effect. In order to enhance the waterproof ability of the EL cell, a waterproof layer 17 is attached to each of the outer faces of the EL cell as shown in FIG. 3.

The EL cell necessitates the AC voltage for driving the light-emitting layer 13 to light up. However, when driven by the AC voltage, the light-emitting particles in the light-emitting layer 13 will be energized to vibrate. Accordingly, the EL cell itself will vibrate and emit noise. Therefore, the quality of use of the EL cell is affected.

In order to solve the problem of noise, a backing is generally employed to increase the thickness of the EL cell. Alternatively, a sound-absorbing sheet is attached to the back of the EL cell. Still alternatively, the main body of the EL cell is solidly attached to the circuit board. Still alternatively, by means of dimension escape, the noise is reduced.

However, with respect to the EL back light cell used in PDA or mobile phone, the thickness specification is limited when designed. Therefore, the backing or sound-absorbing sheet. attaching to the back of the EL cell may lead to problem of excessive thickness. In the case that the EL back light cell is solidly attached to the circuit, over 60% noise is eliminated. However, it is hard to assemble the modules and the double-face adhesive leads to additional cost.

SUMMARY OF THE INVENTION

It is therefore a primary object of the present invention to provide a damping/muffling structure for electroluminescent cell. A damping layer is additionally integrally connected with the electroluminescent cell. The damping layer is able to truly provide a damping effect. This solves the problem of noise resulting from vibration of the EL cell itself when driven by AC voltage and ensures quality of use of the EL cell.

According to the above object, the damping/muffling structure for electroluminescent cell of the present invention includes a front electrode layer on which a light-emitting layer composed of a number of light-emitting particles is overlaid. An inductive layer is overlaid on the light-emitting layer. A back electrode layer is overlaid on the inductive layer. The back electrode layer is surrounded by an insulating packaging layer. A damping layer is integrally connected with the electroluminescent cell. The damping layer is composed of numerous damping molecules with high damping characteristic. By means of AC current of the front electrode layer and the back electrode layer, the light-emitting layer is driven to emit light and at this time the light-emitting particles are energized and vibrated. A friction is created between the damping molecules of the damping layer. The heat generated due to the friction can be dissipated.

The present invention can be best understood through the following description and accompanying drawings wherein:

DETAILED DESCRIPTION OF THE PREFERRED EMBODIMENTS

Figure 1:
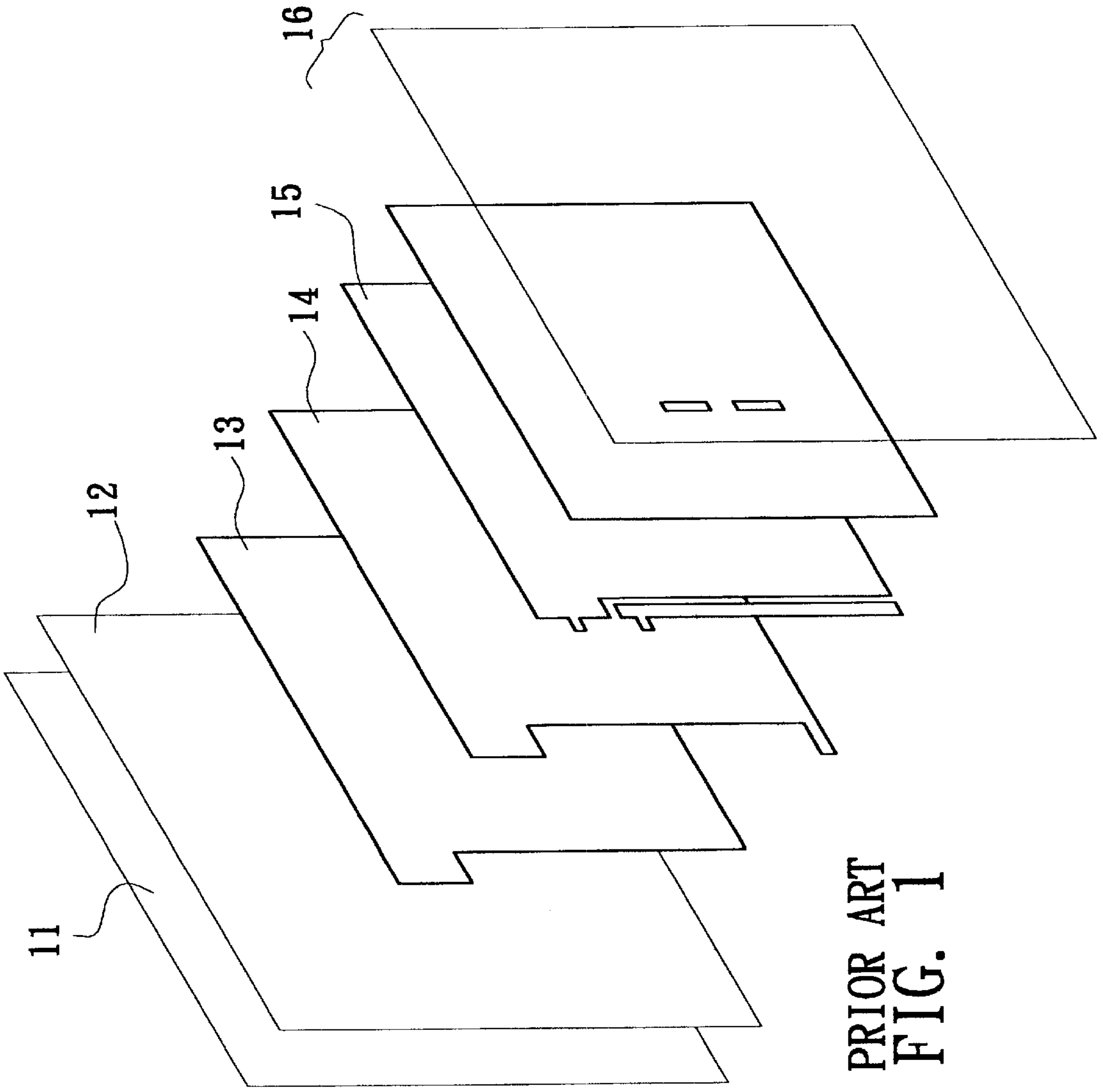
PRIOR ART FIG. 1
FIG. 1 is a perspective exploded view of a conventional EL cell.
Figure 2:
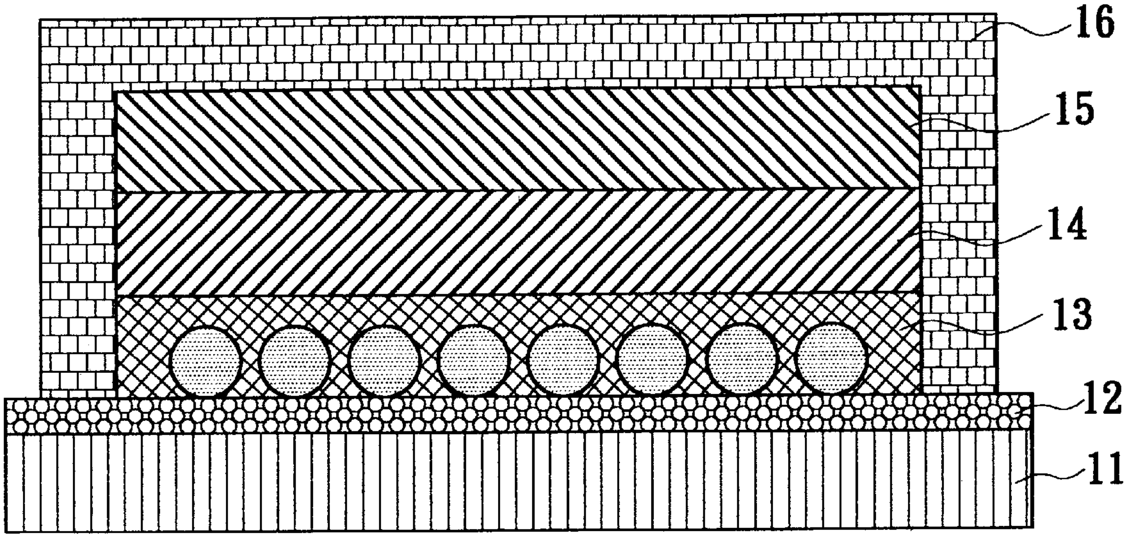
PRIOR ART FIG. 2
FIG. 2 is a sectional assembled view of the conventional EL cell.
Figure 3:
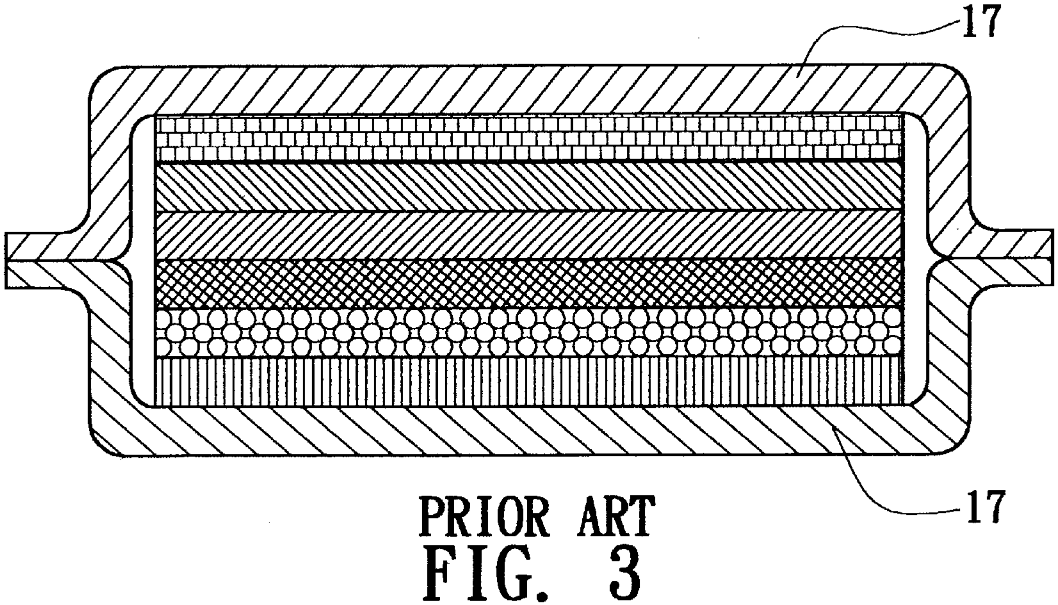
PRIOR ART FIG. 3
FIG. 3 is a sectional assembled view of another conventional EL cell.
Figure 4:
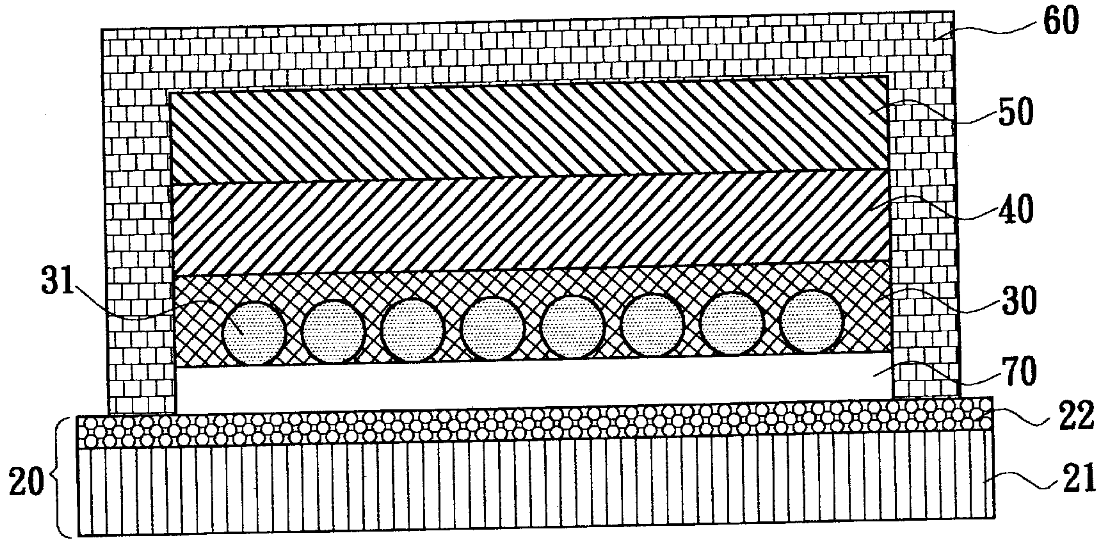
FIG. 4 is a sectional assembled view of a first embodiment of the present invention.

Please refer to FIG. 4. The damping/muffling structure for EL cell of the present invention is able to reduce or eliminate the noise caused by vibration of EL cell when driven.

According to a first embodiment, the EL cell has a front electrode layer 20 on which a light-emitting layer 30 with a number of light-emitting particles 31 is overlaid. An inductive layer 40 is overlaid on the light-emitting layer 30. A back electrode layer 50 is overlaid on the inductive layer 40. The back electrode layer 50 is surrounded by an insulating packaging layer 60. A damping layer 70 is integrally connected between the front electrode layer 20 and the light-emitting layer 30. The damping layer 70 is composed of numerous damping molecules 71 with high damping characteristic.

In this embodiment, the front electrode layer 20 is composed of a transparent substrate (PET) layer 21 and a conductive (ITO) layer 22. The insulating packaging layer 60 is composed of an insulating layer 61 and an ACP layer 62.

The damping material of the damping layer 70 can be natural rubber, artificial rubber, mixture of natural rubber and artificial rubber, acrylic resin, halogen-containing resin, silicon-containing resin, epoxy acrylic resin, etc. Such material has high damping effect between the molecules. The damping material is selected in consideration with chemical properties, physical properties, photoelectric properties, spraying characteristic and weather-resistance.

Figure 5:
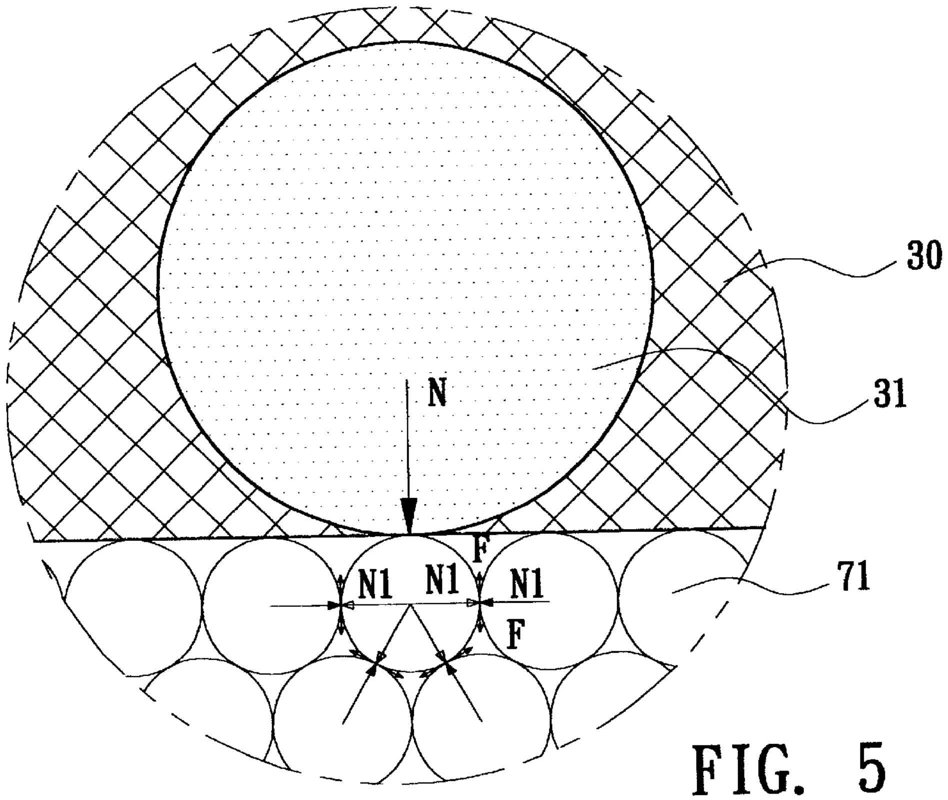
FIG. 5 shows that the light-emitting particles of the light-emitting layer are vibrated and a friction is created between the damping molecules of the damping layer of the present invention to absorb the vibration.

Further referring to FIG. 5, by means of the AC current of the front electrode layer 20 and the back electrode layer 50, the light-emitting layer 30 is driven to emit light. At this time, the light-emitting particles 31 are energized and vibrated to create a vibrating force N and collide the damping molecules 71 of the damping layer 70 adjacent to the light-emitting particles 31. A normal force N1 is created between the multiple damping molecules 71 of the damping layer 70 and a frictional force F is further created between the damping molecules 71. The frictional force F is the product of the frictional coefficient $\mu$ and the normal force N1. The dynamic energy of the light-emitting particles 31 is transformed into the heat generated due to friction between the damping molecules 71. The heat can be dissipated. Accordingly, when the light-emitting layer 30 is driven by the AC current to emit light, the energizing and vibration of the light-emitting particles 31 are reduced or eliminated. Furthermore, the covibration between the other layers is also reduced so as to reduce or eliminate noise.

In the present invention, the specific damping material is painted near the light-emitting layer 30 which is the vibration source so as to reduce or eliminate the energizing and vibration of the light-emitting particles 31 when the light-emitting layer 30 is driven by the AC current and thus reduce or eliminate noise.

During manufacturing procedure of the EL cell, the damping layer 70 is respectively painted in different structural layers so as to directly reduce or eliminate the problem of the EL cell resulting from its own vibration. In structure, no thickness is increased or only a thickness of 10~20 $\mu$m is increased. Therefore, the total thickness will not exceed the specification and the assembling procedure will not be more difficult. In addition, the cost for double-face adhesive can be saved.

Figure 6:
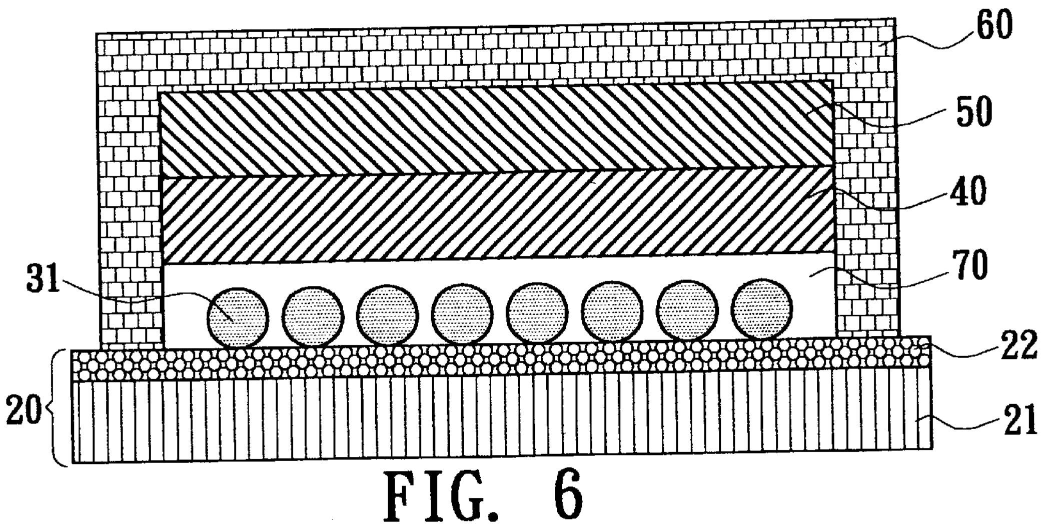
FIG. 6 is a sectional assembled view of a second embodiment of the present invention.

FIG. 6 shows a second embodiment of the present invention, in which the damping layer 70 is directly disposed in the light-emitting layer 30. When driven by the AC current of the front electrode layer 20 and the back electrode layer 50 to emit light, the light-emitting particles 31 in the damping layer 70 are energized and vibrated. A friction is created between the damping molecules 71. The heat generated due to the friction can be dissipated so that the energizing and vibration of the light-emitting particles 31 due to driving of the AC current can be reduced or eliminated and thus the noise can be reduced or eliminated.

Figure 7:
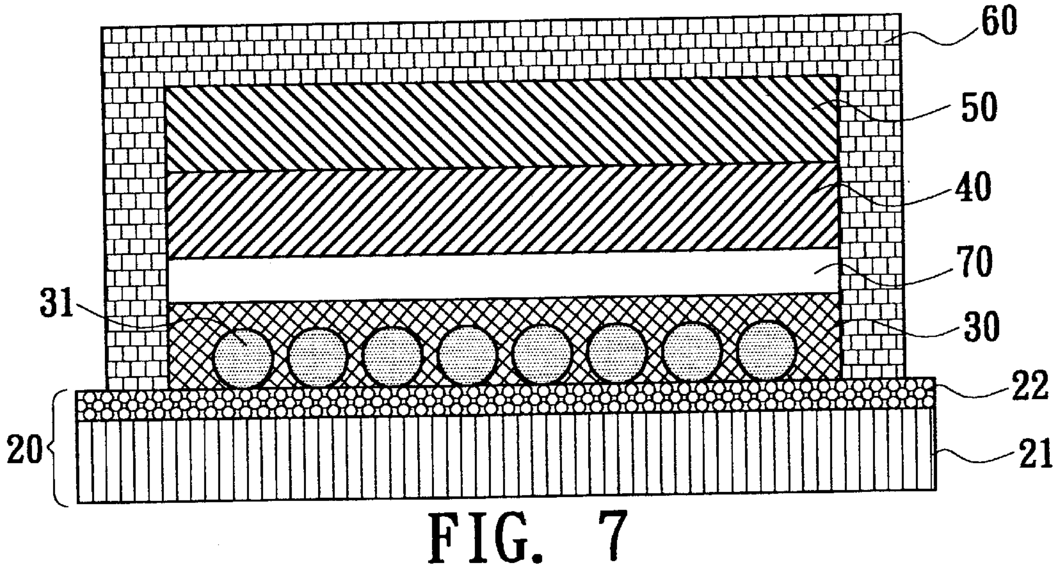
FIG. 7 is a sectional assembled view of a third embodiment of the present invention.

FIG. 7 shows a third embodiment of the present invention, in which the damping layer 70 is positioned between the light-emitting layer 30 and the inductive layer 40. When the light-emitting layer 30 is driven by the AC current of the front electrode layer 20 and the back electrode layer 50 to emit light, the light-emitting particles 31 are energized and vibrated. A friction is created between the damping molecules 71 of the damping layer 70. The heat generated due to the friction can be dissipated so that the energizing and vibration of the light-emitting particles 31 due to driving of the AC current can be reduced or eliminated and thus the noise can be reduced or eliminated.

Figure 8:
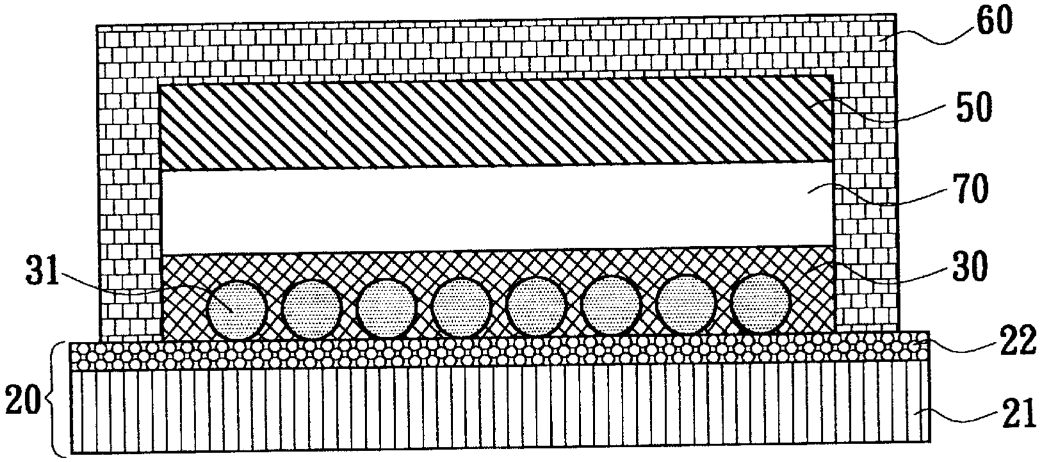
FIG. 8 is a sectional assembled view of a fourth embodiment of the present invention.

FIG. 8 shows a fourth embodiment of the present invention, in which the damping layer 70 is directly disposed in the inductive layer 40. When driven by the AC current of the front electrode layer 20 and the back electrode layer 50 to emit light, the light-emitting particles 31 in the damping layer 70 are energized and vibrated. A friction is created between the damping molecules 71. The heat generated due to the friction can be dissipated so that the energizing and vibration of the light-emitting particles 31 due to driving of the AC current can be reduced or eliminated and thus the noise can be reduced or eliminated.

Figure 9:
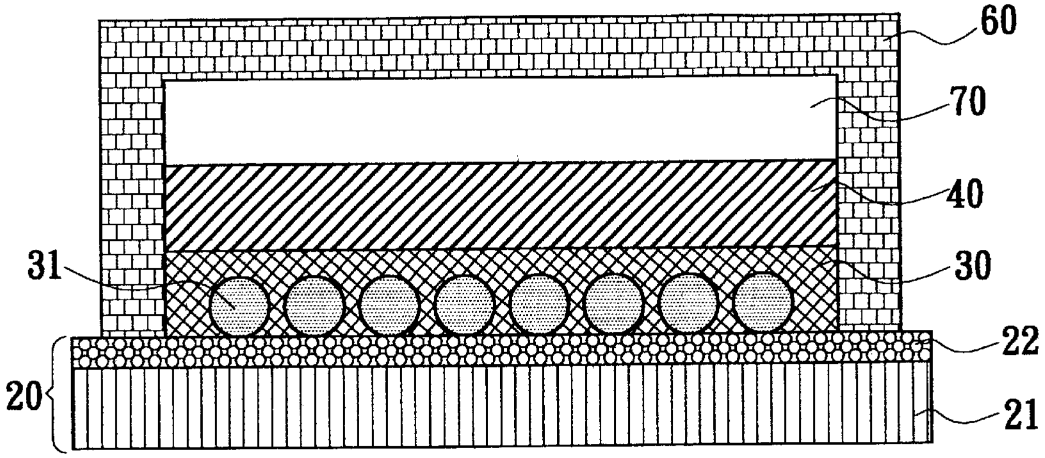
FIG. 9 is a sectional assembled view of a fifth embodiment of the present invention.

FIG. 9 shows a fifth embodiment of the present invention, in which the damping layer 70 is directly disposed in the back electrode layer 50. When driven by the AC current of the front electrode layer 20 and the back electrode layer 50 to emit light, the light-emitting particles 31 in the damping layer 70 are energized and vibrated. A friction is created between the damping molecules 71. The heat generated due to the friction can be dissipated so that the energizing and vibration of the light-emitting particles 31 due to driving of the AC current can be reduced or eliminated and thus the noise can be reduced or eliminated. Therefore, a damping/muffling effect is achieved.

Figure 10:
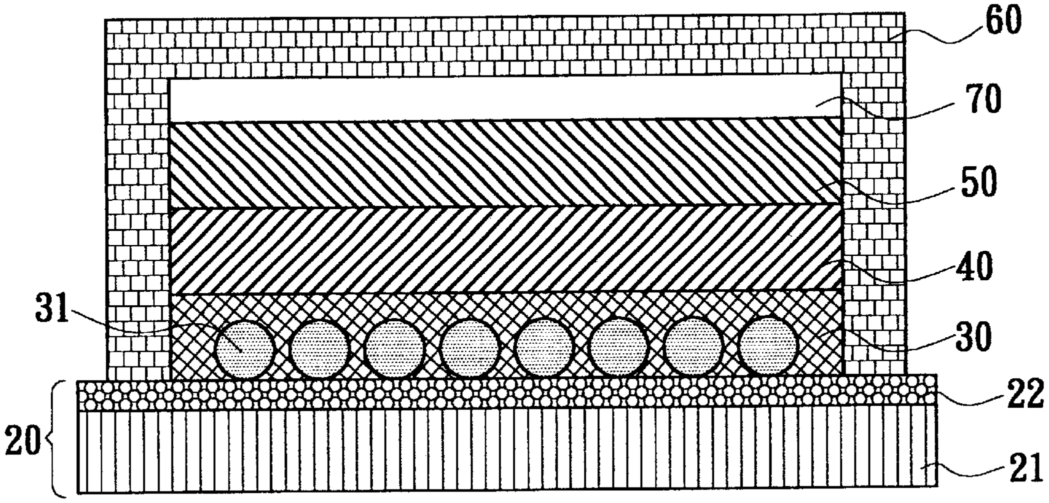
FIG. 10 is a sectional assembled view of a sixth embodiment of the present invention.

FIG. 10 shows a sixth embodiment of the present invention, in which the damping layer 70 is positioned between the back electrode layer 50 and the insulating packaging layer 60. When driven by the AC current of the front electrode layer 20 and the back electrode layer 50 to emit light, the light-emitting particles 31 in the damping layer 70 are energized and vibrated. A friction is created between the damping molecules 71. The heat generated due to the friction can be dissipated so that the energizing and vibration of the light-emitting particles 31 due to driving of the AC current can be reduced or eliminated and thus the noise can be reduced or eliminated. Therefore, a damping/muffling effect is achieved.

Figure 11:
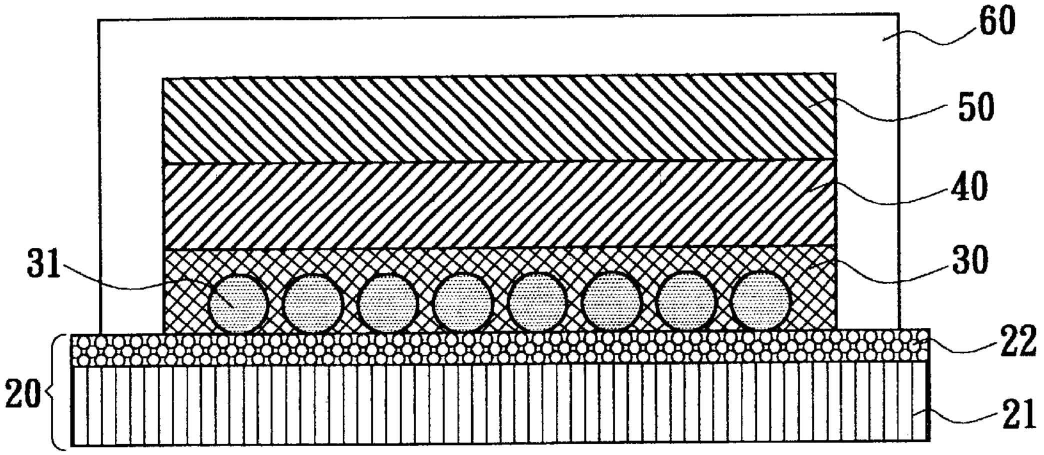
FIG. 11 is a sectional assembled view of a seventh embodiment of the present invention.

FIG. 11 shows a seventh embodiment of the present invention, in which the damping layer 70 is directly disposed in the insulating packaging layer 60. When driven by the AC current of the front electrode layer 20 and the back electrode layer 50 to emit light, the light-emitting particles 31 in the damping layer 70 are energized and vibrated. A friction is created between the damping molecules 71. The heat generated due to the friction can be dissipated so that the energizing and vibration of the light-emitting particles 31 due to driving of the AC current can be reduced or eliminated and thus the noise can be reduced or eliminated. Therefore, a damping/muffling effect is achieved.

According to the above arrangement, the EL cell of the present invention has the following advantages: The present invention is able to greatly or totally eliminate the noise caused by vibration. The damping layer is painted on the EL cell to truly provide a damping effect. This solves the problem of noise resulting from vibration of the EL cell itself when driven by AC voltage and ensures quality of use of the EL cell.

The above embodiments are only used to illustrate the present invention, not intended to limit the scope thereof. Many modifications of the above embodiments can be made without departing from the spirit of the present invention.

What is claimed is:

1. A damping/muffling structure for electroluminescent cell comprising a front electrode layer on which a light-emitting layer composed of a number of light-emitting particles is overlaid, an inductive layer being overlaid on the light-emitting layer, a back electrode layer being overlaid on the inductive layer, the back electrode layer being surrounded by an insulating packaging layer, a damping layer being integrally connected with the electroluminescent cell, the damping layer being composed of numerous damping molecules with high damping characteristic, whereby by means of AC current of the front electrode layer and the back electrode layer, the light-emitting layer is driven to emit light and at this time the light-emitting particles are energized and vibrated, a friction being created between the damping molecules of the damping layer, the heat generated due to the friction being dissipated.

2. The damping/muffling structure for electroluminescent cell as claimed in claim 1, wherein the damping layer is positioned between the front electrode layer-and the light-emitting layer.

3. The damping/muffling structure for electroluminescent cell as claimed in claim 1, wherein the damping layer is directly disposed in the light-emitting layer.

4. The damping/muffling structure for electroluminescent cell as claimed in claim 1, wherein the damping layer is positioned between the light-emitting layer and the inductive layer.

5. The damping/muffling structure for electroluminescent cell as claimed in claim 1, wherein the damping layer is directly disposed in the inductive layer.

6. The damping/muffling structure for electroluminescent cell as claimed in claim 1, wherein the damping layer is directly disposed in the back electrode layer.

7. The damping/muffling structure for electroluminescent cell as claimed in claim 1, wherein the damping layer is positioned between the back electrode layer and the insulating packaging layer.

8. The damping/muffling structure for electroluminescent cell as claimed in claim 1, wherein the damping layer is directly disposed in the insulating packaging layer.

* * * * *